United States Patent [19]

Speich

[11] Patent Number: 4,493,346
[45] Date of Patent: Jan. 15, 1985

[54] COUPLING ARRANGEMENT USABLE IN A TEXTILE MACHINE

[75] Inventor: Francisco Speich, Gipf-Oberfrick, Switzerland

[73] Assignee: Textilma AG

[21] Appl. No.: 335,878

[22] Filed: Dec. 30, 1981

[30] Foreign Application Priority Data

Jan. 9, 1981 [CH] Switzerland ............... 103/81

[51] Int. Cl.³ .................. G05G 1/00; F16D 13/04; F16D 11/06; D03C 1/00
[52] U.S. Cl. ................................. 139/76; 74/570; 192/33 R; 192/71
[58] Field of Search ............. 74/570; 66/203, 204, 66/207, 208; 192/33 R, 71, 93 R; 139/66 R, 76

[56] References Cited

U.S. PATENT DOCUMENTS

| 2,627,758 | 2/1953 | Wales | 74/570 |
| 3,724,510 | 4/1973 | Kleiner | 139/66 R |
| 3,724,511 | 4/1973 | Kleiner | 139/66 R |
| 3,730,231 | 5/1973 | Hoenig | 139/66 R |
| 3,730,232 | 5/1973 | Kleiner | 139/66 R |

FOREIGN PATENT DOCUMENTS

| 1535258 | 7/1970 | Fed. Rep. of Germany. | |
| 2036647 | 12/1971 | Fed. Rep. of Germany | 139/66 R |
| 2036644 | 12/1971 | Fed. Rep. of Germany | 139/66 R |
| 86948 | 3/1966 | France | 139/66 R |
| 703280 | 2/1954 | United Kingdom | 139/76 |

Primary Examiner—Allan D. Herrmann
Assistant Examiner—Michael J. Gonet
Attorney, Agent, or Firm—Toren, McGeady and Stanger

[57] ABSTRACT

In a coupling arrangement for a textile machine, a drive shaft can be intermittently rotated and a connecting member encircles and is connected to the drive shaft by an eccentric hoop located between them. A coupling key is displaceable between a first coupling recess associated with the drive shaft and a second coupling recess associated with the connecting member. The coupling key is retained in the recesses by lead cams. A retaining key, independent from the coupling key, is supported by the eccentric hoop. The retaining key cooperates with a first retaining recess on the drive shaft or with a second retaining recess on the connecting member. The retaining key and/or the retaining recesses have control surfaces which provide the displacement of the retaining key when the drive shaft overtakes the eccentric hoop or the eccentric hoop overtakes the connecting member.

20 Claims, 13 Drawing Figures

COUPLING ARRANGEMENT USABLE IN A TEXTILE MACHINE

SUMMARY OF THE INVENTION

The present invention is directed to a coupling arrangement for a textile machine or the like and, more particularly, it concerns a drive shaft capable of intermittent rotation with an eccentric hoop extending around the drive shaft and a connecting member encircling the drive shaft outwardly from and supported on the eccentric hoop. A coupling part is movably guided on the eccentric hoop for displacement approximately radially of the drive shaft. The coupling part or key can be engaged within a first coupling recess associated with the drive shaft or in a second coupling recess associated with the connecting member. A shifting member is arranged to displace the coupling part between engagement with the two coupling recesses. Lead cams are arranged to guide the coupling part and retain it in one of the coupling recesses.

Coupling arrangements of this type are known, note the Federal Republic of Germany Pat. No. 1 535 258. In that patent, the coupling key is made up of two grooved blocks supported for movement in the same direction radially of the drive shaft. The grooved blocks are supported in the eccentric hoop and alternately engage either a notch or recess in the drive shaft with one end face or a recess in the connecting member with the other end face. To engage the coupling key, composed of the two grooved blocks, shifting members are employed for pressing the blocks against the drive shaft. Disengagement of the grooved blocks takes place by means of springs which bias the blocks away from the drive shaft toward the connecting member. This coupling arrangement has considerable disadvantages: The drive shaft is temporarily braked for effecting the connecting step and during braking the rotating mass of the eccentric hoop and of the connecting member press the grooved blocks against one another and against the forward side of the notch or recess in the drive shaft. The high mass forces developed in fast-running textile machines are such that the grooved blocks can become jammed fast in the notch and the spring force is insufficient to displace the blocks out of the notch of the drive shaft and to displace them into the recess in the connecting member. As a result, limits on the rotational drive speed are set. Further, when the grooved blocks overrun the edges of the notches, wear is caused on the parts engaged in the coupling process. Moreover, the coupling arrangement construction is relatively complicated, since two grooved blocks must be connected.

Therefore, it is the primary object of the present invention to provide a coupling arrangement of the general type referred to above so that, even with fast-running drive shafts, a faultless coupling is assured and at the same time the construction of the coupling arrangement is simple.

In accordance with the present invention, a retaining part or key is movably guided on the eccentric hoop and it is displaceable generally in the radial direction of the drive shaft. The retaining key is spaced angularly from and is separate from the coupling key. A first retaining recess is provided in the main shaft or a part associated with it and a second retaining recess is provided in the connecting member. The control surfaces on at least one of the retaining key and the first and second retaining recesses provide a displacement of the retaining key from one or the other of the recesses when the drive shaft overtakes the eccentric hoop or when the eccentric hoop overtakes the connecting member.

By providing an independent retaining key with the coupling key, with the retaining key acting counter to the drive direction, when the drive is braked, the retaining key can relieve the coupling key of the forces developed by the braked masses, so that the coupling key is easy to shift. Such an arrangement effects a substantial unburdening of the shifting member permitting such member to be constructed more simply. Another advantage is that only the coupling key needs to be shifted with the retaining key being displaceable because of the manner in which it and its cooperating recesses are configured. Consequently, this coupling arrangement assures optimum coupling even with fast-running machines and it is subjected only to slight wear.

Additional advantageous features of the coupling arrangement are set forth in the claims. The force application sides of the retaining key can be aligned parallel to the direction of displacement of the key. It is preferable, however, if the key and/or the recesses are arranged so that they form an acute angle with the line of displacement of the retaining key. Using such a shaped configuration affords a coupling action which is free of play. Moreover, the sloping force application sides of the retaining key can interact with recesses in the drive shaft and the connecting member which are shaped in an optional manner. Nevertheless it is advantageous if the sides of the recess cooperating with the force application sides of the retaining key are shaped correspondingly. The force application side on the retaining key and the juxtaposed surface of the recess in the drive shaft extend almost parallel to the radial line extending outwardly from the drive shaft and equidistant between the center lines of the recesses for the coupling key and the retaining key. In such an arrangement, despite the sloping force application sides of the retaining key, an optimum force transfer is effected between the drive shaft or the connecting member and the retaining key. Furthermore, providing rounded edges on the retaining key and in its cooperating retaining recesses facilitates the shifting of the retaining key and cuts down on wear.

It is especially advantageous if the retaining recesses have a width or dimension in the direction of rotation of the drive shaft which is smaller than the corresponding dimension of the coupling key. With such a difference in dimensions, the coupling key cannot engage within the retaining recess. A particularly advantageous construction of the coupling arrangement involves the use of a pawl mounted on the eccentric hoop and biased against the retaining key with the pawl acting approximately perpendicularly of the direction of displacement of the retaining key. The pawl has a nose which engages within a recess in the retaining key when the key seats within the recess in the drive shaft. Further, the pawl biases the retaining key against the drive shaft. With the spring biasing force of the pawl acting perpendicularly of the direction of displacement of the retaining key, a frictional force is developed which prevents any accidental displacement of the retaining key. With the pawl seated within the recess in the retaining key, it biases the key inwardly against the drive shaft and counteracts any accidental disengagement of the retaining key.

Another preferred feature is the provision of a tangential feed-side part for at least one of the coupling recesses in the drive shaft and the connecting member.

With this configuration of the feed-side part an abrupt engagement of the coupling key is avoided and adequate time is available for a smooth entry of the coupling key into its corresponding recess. By slitting the coupling key, it is provided with a springy characteristic so that an abrupt engagement of the coupling key with the juxtaposed surface of the coupling recess is softened. The coupling key is movable parallel to a line extending radially outwardly from the drive shaft and splitting the spacing between the coupling key and the retaining key. With this arrangement the opposite side of the guiding surfaces on the eccentric hoop are disposed in parallel relation. Accordingly, an especially practical power transfer can be effected between the drive shaft and the eccentric hoop, avoiding flexural forces in the coupling key. Further, the juxtaposed sides of the coupling key and the coupling recess can be disposed at an acute angle to the direction of displacement of the key.

In principle, it is possible to locate the lead cam and the recesses in the connecting member itself. It is preferable, however, to provide the lead cam and the recesses in a ring attached to the connecting member so that the production of the coupling arrangement is simplified and the replacement of worn out parts is facilitated. Further, it is also possible to secure the ring to a housing disposed coaxially with the drive shaft. Moreover, with the lead cam and recesses formed in the ring, the attachment of the ring can be effected with safety-shearing members so that a device is provided which protects the remainder of the device when disturbances occur. The ring can extend over the connecting member and it can provide reciprocal guidance for the eccentric hoop and the connecting member. Similarly, a ring can be secured to the drive shaft so that the recesses are formed in the ring.

Another preferred feature of the invention is the provision of a spring biasing the coupling key to the coupling recess in the drive shaft with the key being displaceable out of the recess by means of the shifting member. With the ring biasing action it is simpler to engage the coupling key into the recess in the drive shaft than it is to provide a corresponding disengagement. Disengagement is effected more advantageously by the shifting member, since in disengagement greater lateral forces act on the coupling key than when it is being engaged with the drive shaft.

There are many varied arrangements for providing the interaction between the shifting member and the coupling key. In one embodiment, the coupling key includes a driver cam projecting parallel to the axis of the drive shaft so that the driver cam is acted upon by another cam on the shifting member. Further, the shifting member can be in the form of a shifting ring overlapping the travel path of the driver cam on the coupling key. A guide groove can be provided in the shifting ring with the driver cam passing through the groove with a control cam located in the path of the driver cam. In this arrangement, the connecting ring is supported eccentrically parallel to the axis, and is moved back and forth in a swinging movement by an actuating device.

Accordingly, the coupling arrangement is distinguished by an especially simple and effective construction and affords a safe shifting even when used with high speed drive shafts and when it is under load. Furthermore, the coupling arrangement is suitable for the most varied uses. A particular use is for driving machine parts in a textile machine, for example, the guide bars of a warp knitting machine or the shafts of a weaving machine.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

In FIGS. 1 to 4 the coupling arrangement of the present invention is illustrated and includes a drive shaft 2 which can be rotated intermittently so that after each 180° turn, the shaft comes nearly to a stop or to a complete stop. A circular bearing 4 is fixed on the drive shaft 2 by a key 6 so that the bearing and shaft rotate as a unit. A roller bearing 8 encircles the circular bearing 4 and an eccentric hoop 10 is mounted on the roller bearing. Another roller bearing 12 is spaced radially outwardly from the roller bearing 8 and supports a ring-shaped connecting member 14 so that it is fitted around the eccentric hoop 10. The connecting member 14 includes a connecting rod 16 articulated to an oscillating member 18 which drives a shaft, not shown in any further detail. By means of the coupling arrangement it is possible for the connecting rod 16 to perform a reciprocating movement H between the points $H_1$ and $H_2$. A coupling key 20 serves to couple the eccentric hoop 10 to the drive shaft 2 or to interconnect the eccentric hoop 10 with the connecting member 14. Accordingly, coupling key 20 is alternately engageable into at least one coupling recess 22 formed in or associated with the drive shaft 2 or into at least one coupling recess 24 formed in or associated with the connecting member 14. Lead cams 28 and 26 guide the coupling key 20 between the coupling recesses 22, 24, respectively. During rotation the lead cams 26, 28 prevent disengagement of the coupling key out of the coupling recess within which it is seated. The coupling key 20 is guided in the radial direction between the radially inner coupling recesses 22 and the radially outer coupling recesses 24 on the eccentric hoop 10. A shifting member 30 which can be actuated according to standard conditions, serves to control the position of the coupling key 20. Further, separate from and spaced angularly around the drive shaft from the coupling key is a retaining key 32. Retaining key 32 is supported on the eccentric hoop 10 and is movable approximately radially of the drive shaft. The retaining key is effective to counter the driving direction A of the drive shaft 2. Displacement of the retaining key 32 is effected automatically in accordance with the position of the coupling key 20. Retaining key 32 is displaceable between at least one retaining recess 34 associated with the drive shaft 2 and another retaining recess 36 associated with the connecting member 14. By displacing the retaining key in the radial direction it can be moved between the radially inner recess 34 and the radially outer recess 36. Control surfaces 38,40 are located on the radially inner and outer ends of the retaining key 2 while corresponding control surfaces 42, 44 are formed on the radially inner retaining recess 34 and the radially outer retaining recess 36. These control surfaces effect the displacement of the retaining key 32 out of one or the other of the recesses when the drive shaft 2 overtakes the eccentric hoop 10 or the eccentric hoop 10 overtakes the connecting member 14 with the retaining key positioned opposite the respective recess. Further, the lead cams 26 and 28 guide the retaining key 32 against disengagement when secured within one of the retaining recesses 34, 36.

In the embodiment illustrated, the coupling arrangement is provided so that at two positions spaced angularly 180° apart, it is possible to couple the eccentric hoop 10 to the drive shaft 2. Consequently, there are two coupling recesses 22, 24 as well as two retaining recesses 34, 36, each pair angularly spaced apart by 180°.

The coupling recesses 22 and the retaining recesses 34 associated with the drive shaft 2 are formed in a radially extending flange 46 on the circular bearing 4. Further, lead cam 28 extends circumferentially around the radially extending flange 46. Moreover, flange 46 serves to limit the roller bearing 8 in the lateral direction.

Figure 4:
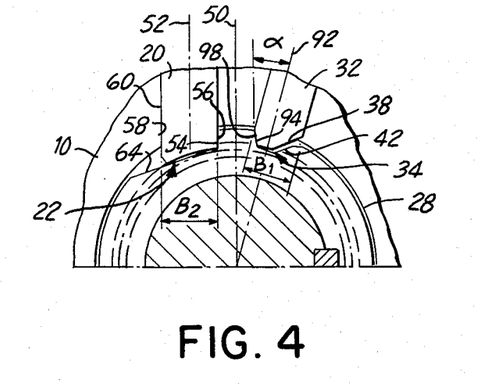
FIG. 4 is a partial sectional view, on an enlarged scale, of the coupling key and the retaining key in engagement with the drive shaft.
Figure 5:
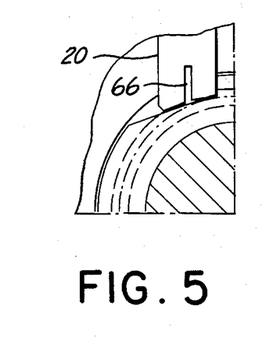
FIG. 5 is another embodiment of the coupling key.

Coupling key 20 is movably supported in a groove 48 in the eccentric hoop 10. As shown in FIG. 4, the coupling key 20 is movable parallel to a radial line 50 of the drive shaft. Radial line 50 is spaced approximately equidistantly between the coupling key 20 and the retaining key 32. As can be seen in FIG. 4, the coupling key 20 has a side 54 parallel to the direction of displacement 52 of the key. Coupling side 54 extends along a corresponding coupling side 56 formed in the coupling recess 22. The supporting side 58 of the coupling key 20 opposite the side 54 extends along a corresponding support surface 60 formed in the eccentric hoop 10. Coupling key 20 is spaced angularly from the radial line 50 so that the side 56 in the coupling recess 22 is arranged approximately parallel to the support surface 60 in the eccentric hoop 10. With this arrangement, an optimum power transfer is achieved and flexural stress in the coupling key is avoided. A biasing spring 62 is located between the coupling key 20 and the eccentric hoop and biases the coupling key toward the drive shaft 2 for assuring the engagement of the key into the coupling recess 22 associated with the drive shaft when the shifting member 30 is in a coupling position. As can be seen in a number of the figures, particularly FIGS. 4 and 7, the coupling recesses 22, associated with the drive shaft 2, each has an approximately tangential feed-side surface 64 for permitting a smooth engagement of the coupling key into the coupling recess. This smooth engagement is facilitated by the biasing spring 62 which supports the coupling action. In another embodiment of the coupling key 20, as shown in FIG. 5, a slit 66 is open toward the coupling recess 22 and the slit provides the coupling key with a springy characteristic which softens the engagement of the coupling key in the coupling recess 22.

Figure 3:
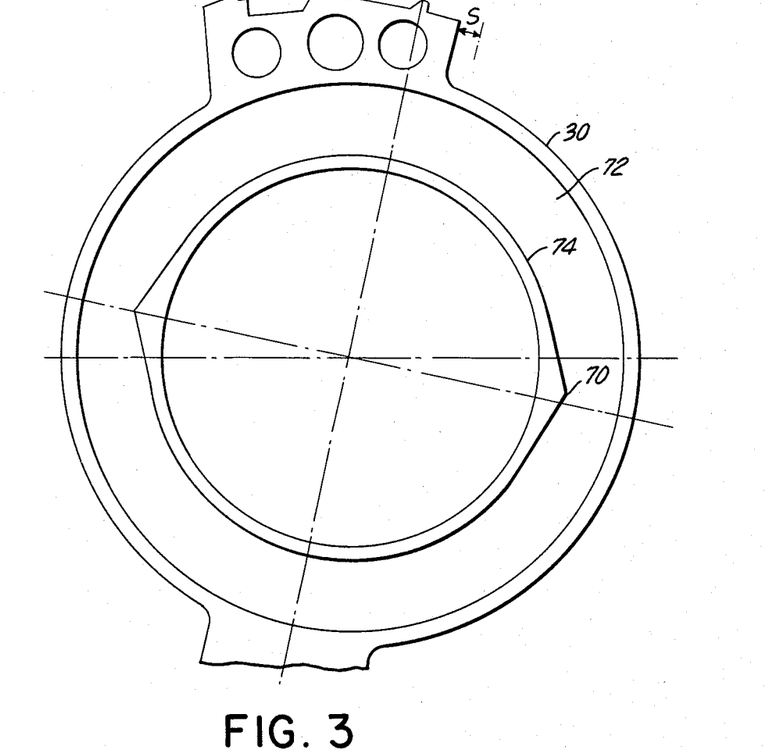
FIG. 3 is a side view of a shifting member for the coupling arrangement.

A driver cam 68 is secured to and extends laterally outwardly from the coupling key 20 and interacts with control cams 70 on the shifting member, note FIG. 3, for effecting the disengagement of the coupling key 20 out of the coupling recess on the drive shaft.

Figure 1:
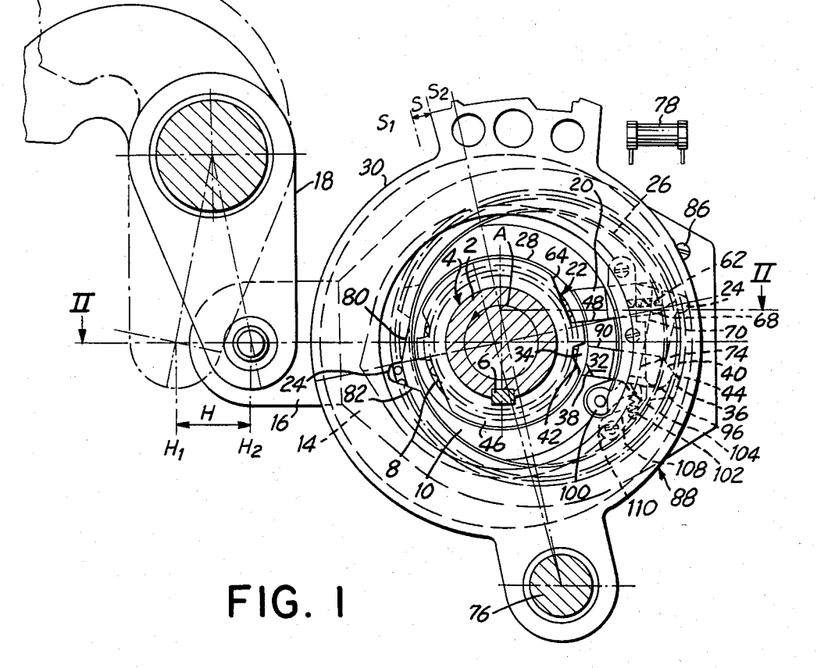
FIG. 1 is a side view, partly in section, of a coupling arrangement for a drive shaft.
Figure 2:
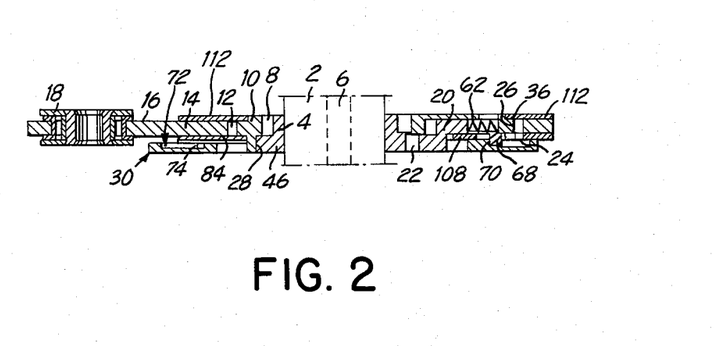
FIG. 2 is a sectional view of the coupling arrangement taken along the line II—II in FIG. 1.

Accordingly, shifting member 30 is formed as a shifting ring which covers or extends over the travel path of the driver cam and has a guiding groove 72 in which the driver cam 68 moves. The radially inner side of the groove 72 contains the control cams 70. As shown in FIG. 1, an outwardly protruding part of the shifting ring is pivotally supported on a pin 76 spaced in parallel relation with the drive shaft 2 and laterally outwardly from the drive shaft. An actuating device 78, such as a pneumatic piston-cylinder unit controlled for standardized movement, and known per se, serves to pivot the shifting member through the path S, note FIG. 1. At its end facing outwardly away from the drive shaft 2, the coupling key 20 can engage within the coupling recess 24 associated with the connecting member 14. Coupling recess 24 also has an approximately tangential feed-side surface 80 and an inclined outlet side surface 82 which facilitates disengagement. Lead cam 26 extends from the feed-side surface 80 and runs into the outlet side surface 82. Coupling recess 24 and lead cam 26 are formed in a ring 84 supported on a lateral surface of the connecting member 14 and projecting radially inwardly toward the drive shaft 2, note FIG. 2. In addition, ring 84 serves to support the connecting member 14 and the roller bearing 12 on the eccentric hoop 10. Ring 84 is secured to the connecting member 14 by bolts 86 and pins 88. The bolts 86 and pins 88 are shaped as safety-shearing members which shear when the coupling key 20 prevents proper operation.

Retaining key 32 is also movably supported in a groove 90 in the eccentric hoop with the direction of displacement of the key extending basically radially of the drive shaft 2, note FIG. 4. The radially inner force application side 94 of the retaining key 32 facing the drive shaft 2, and the radially outer force application side 96 facing the connecting member 14 form an acute angle α with regard to the line or direction of displacement 92 of the retaining key. Due to this orientation of the force application sides or surfaces, the retaining key 32 exerts a wedging effect, so that with the coupling key engaged in a corresponding coupling recess, all play is excluded. The radially inner force application surface or side 94 on the retaining key 32 facing the drive shaft 2 and the juxtaposed side 98 of the radially inner retaining recess 34 are approximately parallel to the radial line 50 spaced between the coupling key 20 and the retaining key 32, note FIG. 4. With this arrangement, an optimum power distribution is possible. As can be seen in FIG. 4, the width $B_2$ of the coupling key 20, that is the dimension in the circumferential direction of the drive shaft 2 is greater than the width $B_1$ of the retaining recess 34 so that it is not possible for the coupling key to engage within the retaining recess 34.

As is illustrated best in FIGS. 6–13, a pawl 100 is pivotally supported on the eccentric hoop 10 and is biased by a spring 102 against the generally radially extending side of the retaining key 32. When the retaining key is disengaged from the retaining recess 34, nose 104 on the pawl 100 acts approximately perpendicularly on the adjacent generally radially extending side of the retaining key 32. The frictional force developed by this interaction prevents any involuntary or accidental displacement of the retaining key 32 in the direction of the retaining recess 34 in the drive shaft 2. On the other hand, if the retaining key is in engaged within the retaining recess 34, nose 104 extends into a recess 106 in the adjacent side of the retaining key and biases the retaining key into the retaining recess 34. As a result, accidental displacement of the retaining key 32 from the retaining recess 34 is prevented. The pawl 100 along with the retaining key 32 and the coupling key 20 are held on the eccentric hoop 10 by a holding plate 108. The holding plate 108 is secured to the eccentric hoop 10 by bolts 110, note FIGS. 1 and 2.

Retaining recess 36 associated with the connecting member 14 is located in a ring 112 provided on one surface of the connecting member 14 on the opposite side from the ring 84 which contains the radially outer coupling recess 24 for the coupling key 20. A circumferentially extending edge of ring 112 forms the lead cam 26 which serves as a guide for the retaining key 32. Further, ring 112 acts as a guide for the connecting member 14 and for the roller bearing 12 on the eccentric hoop 10.

As distinguished from the embodiment illustrated, it is possible not to connect the rings 84, 112 with the connecting member 14, but to arrange them concentrically to the drive shaft and to secure them in a stationary position on a housing, not shown.

The manner in which the coupling arrangement operates is described in more detail with respect to FIGS. 6 to 13.

Figure 6:
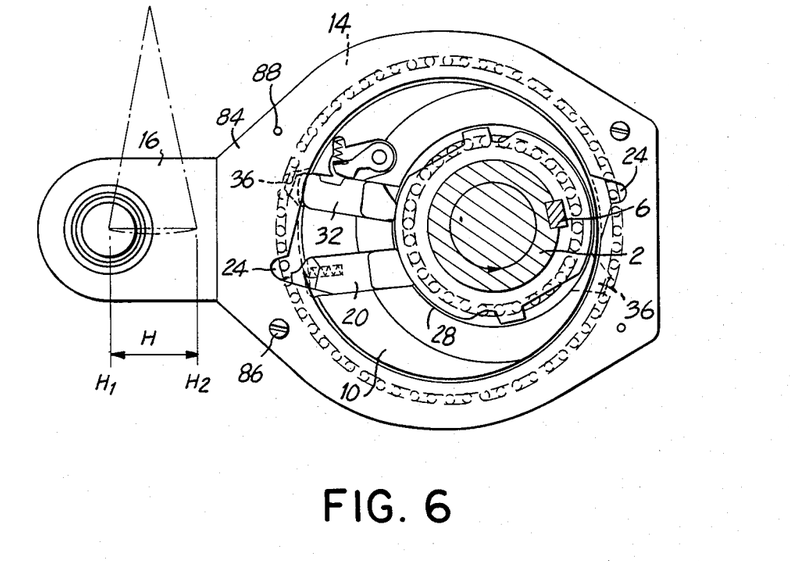
FIGS. 6 to 12 are side views, partly in section, of the coupling arrangement illustrated in FIG. 1 with the shifting ring or member removed and illustrating the various coupling phases of the arrangement.

In FIG. 6 the coupling arrangement is shown in the phase where the drive shaft 2 is freely rotatable and the coupling and retaining keys 20, 32 are engaged in the radially outer coupling recesses 24, 36 associated with the connecting member 14. In this phase, the eccentric hoop 10 connected with the connecting member 14, is held securely against rotation with the drive shaft.

Figure 7:
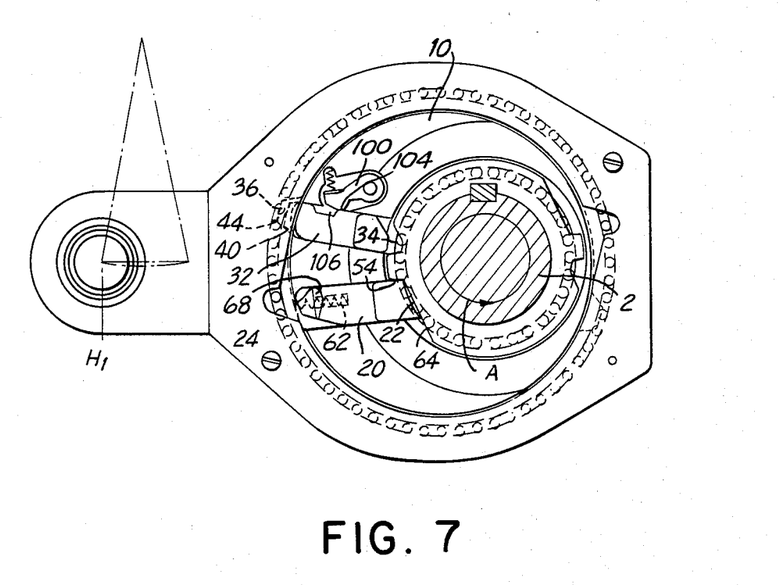
Figure 8:
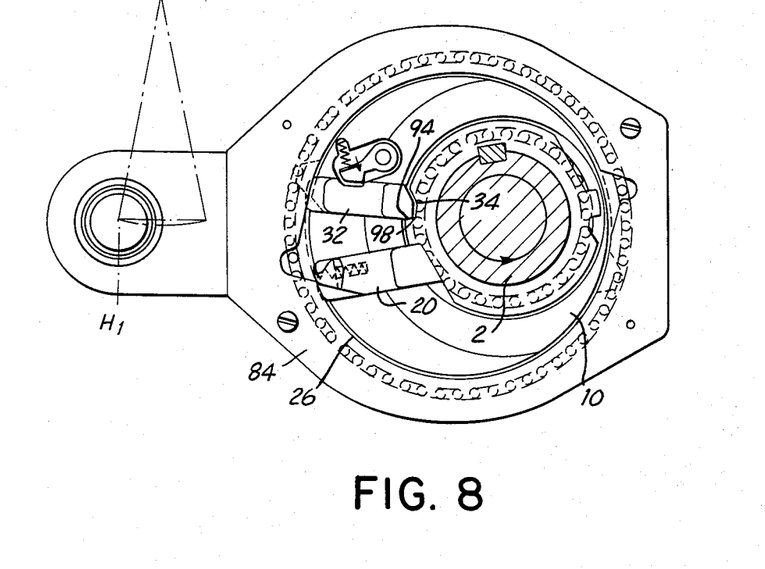

In FIGS. 7 and 8 the coupling arrangement is shown when the shifting member 30 is placed in the position $S_2$, note FIG. 1, whereby the control cams 70 on the shifting member act on the driver cam 68 of the coupling key 20 releasing it from the engaged position with the coupling recess 24. Accordingly, the coupling key 20 biased by the spring 62 moves along the lead cam 28 and enters on the tangential feed-side surface 64 into the radially inner coupling recess 22 with its coupling side 54 disposed in contact with the corresponding coupling side 56 in the coupling recess 22. At the same time, retaining key 32 is held in the radially outer retaining recess 36 by the pawl 100 and with the coupling key in the radially inner coupling recess 22, the retaining key is aligned with the radially inner retaining recess 34. If the drive shaft 2 continues to rotate in the drive direction A, the eccentric hoop 10 is carried along with the drive shaft by virtue of the engagement of the coupling key 20 in the coupling recess 22. As a result, the retaining key is also carried along by the eccentric hoop 10 and its radially outer control surface 40 juxtaposed to the control surface 44 in the retaining recess 36, is displaced out of that recess. With its displacement radially inwardly, the retaining key 32 is directed against the drive shaft 2, moving into the corresponding radially inner retaining recess 34. During such movement, pawl 100 with its nose 104 seats within the recess 106 in the side of the retaining key 32 and biases the key into the retaining recess 34. The radially inner force application side 94 of the retaining key 32 interacts with the juxtaposed side 98 of the retaining recess 34 and prevents any play between the drive shaft 2 and the eccentric hoop 10. During the movement of the eccentric hoop coupled with the drive shaft 2 from the position shown in FIG. 8 with the connecting member 14 in position $H_1$, the connecting member is moved into position $H_2$, note FIG. 9, with the radial outer end face of the coupling key 20 disposed in contact with the lead cam 26 on the ring 84 and the radially outer end face of the retaining key 32 is located alongside the lead cam 26 in the ring 112 so that disengagement of the coupling key 20 and the retaining key 32 is prevented.

Figure 9:
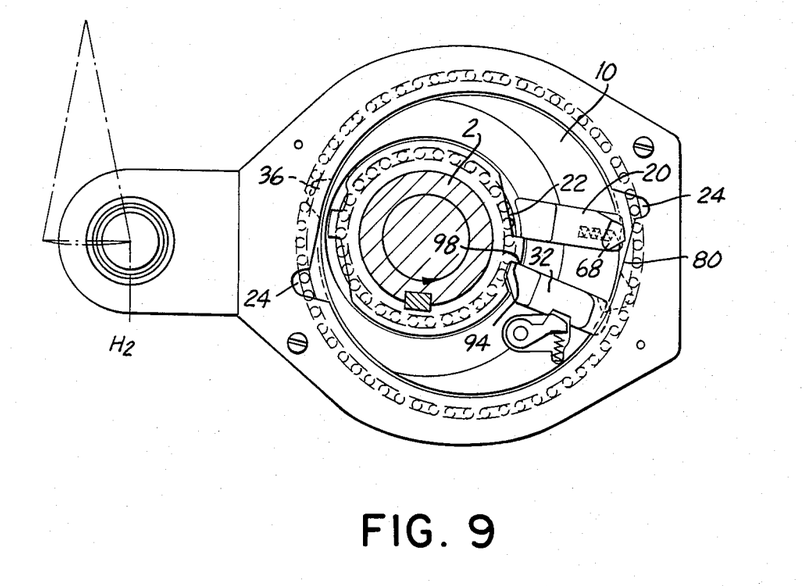
Figure 10:
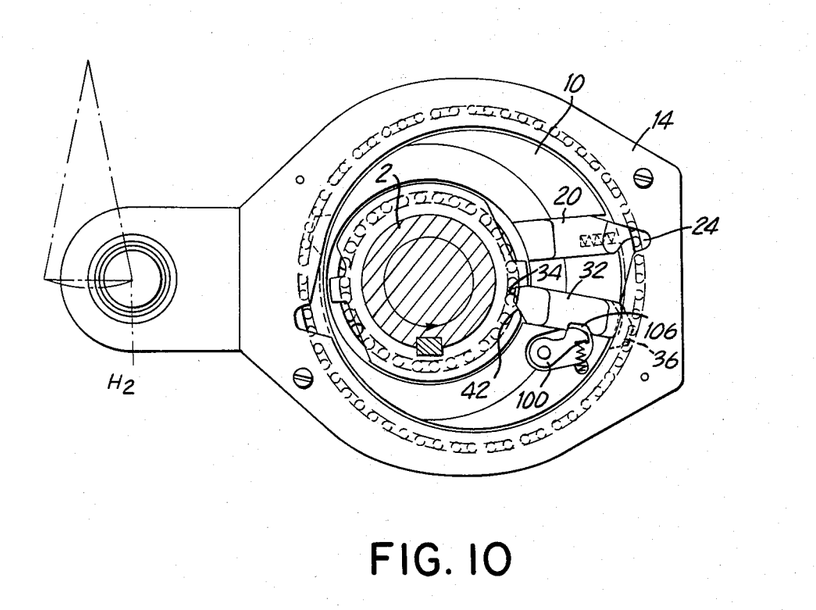
Figure 11:
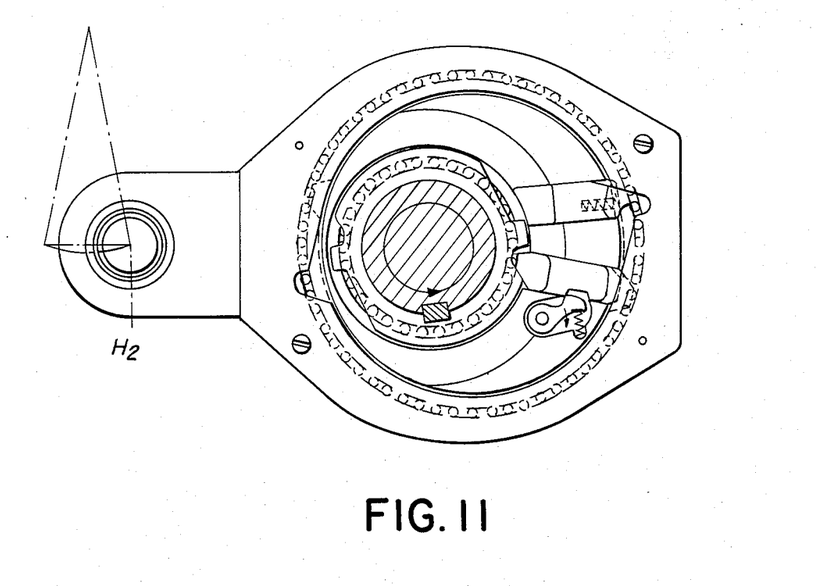
Figure 12:
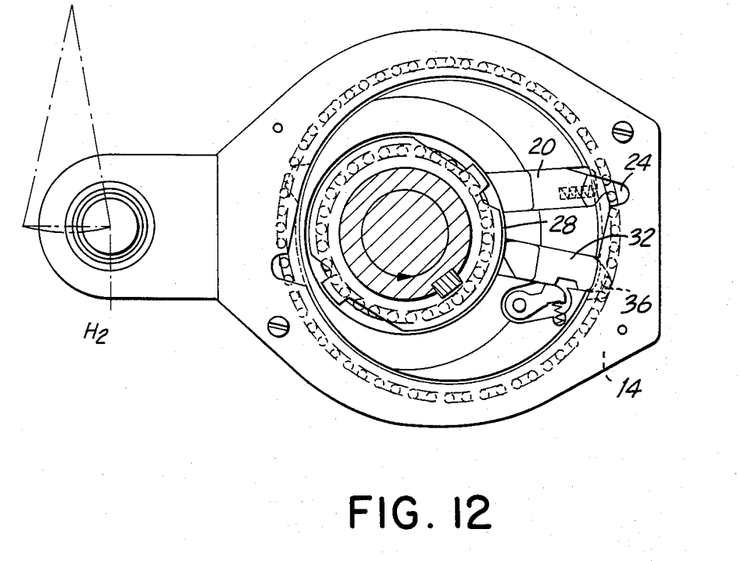

If the shifting member 30 is in the shifting position $S_2$, note FIG. 1, the coupling key is released as shown in FIGS. 9 to 12. During this phase of operation, control cam 70 on the shifting member 30 interacts with the driver cam 68 on the coupling key 20 and displaces the key out of the coupling recess 22 which afforded connection with the drive shaft 2. In view of the tangential feed-side surface 80 in the coupling recess 24, the releasing action takes place gradually, as can be seen in FIGS. 9 and 10. Since the drive shaft 2 is braked during this disengagement operation, the eccentric hoop 10 has the tendency, under the influence of the mass forces, to overtake the drive shaft. Such tendency is prevented by the retaining key 32 with its radially inner force application side 94 located next to the corresponding side 98 of the retaining recess 34. In this way it is possible to release the coupling key out of the coupling recess 22 without causing jamming. As soon as the coupling key is completely released, as shown in FIG. 10, the coupling key engages in the radially outer coupling recess 24 associated with the piston rod or connecting member 14 and continued rotation of the eccentric hoop 10 is prevented. Further, this action has the effect that the drive shaft 2, by means of its control surface 42, displaces the retaining key 32 out of the radially inner retaining recess 34 and displaces the retaining key into the radially outer retaining recess 36 so that it is now in contact with the connecting member 14. At the same time, the pawl 100 is displaced out of the recess 106 in the side of the retaining key 32 with the biasing action directing the retaining key inwardly against the drive shaft being overcome and the biasing action acting perpendicularly against the retaining key, note FIGS. 11 and 12.

In this phase of the operation of the coupling arrangement, the drive shaft 2 can continue to rotate freely with the coupling key 20 and the retaining key 32 being held by the lead cams 28 so that they cannot move out of the radially outer coupling recess 24 or retaining recess 36 associated with the connecting member 14. Accordingly, a new coupling work-cycle can begin, as is shown in FIGS. 6 to 12, but with the eccentric hoop rotated through 180°.

The following shifting conditions are possible:
(A1) If the shifting member 30 is placed in position $S_1$, the connecting member 14 assumes position $H_1$ or it remains in that position;
(A2) If the shifting member is moved into position $S_2$, the connecting member 14 assumes the position $H_2$ or remains in that position.

Figure 13:
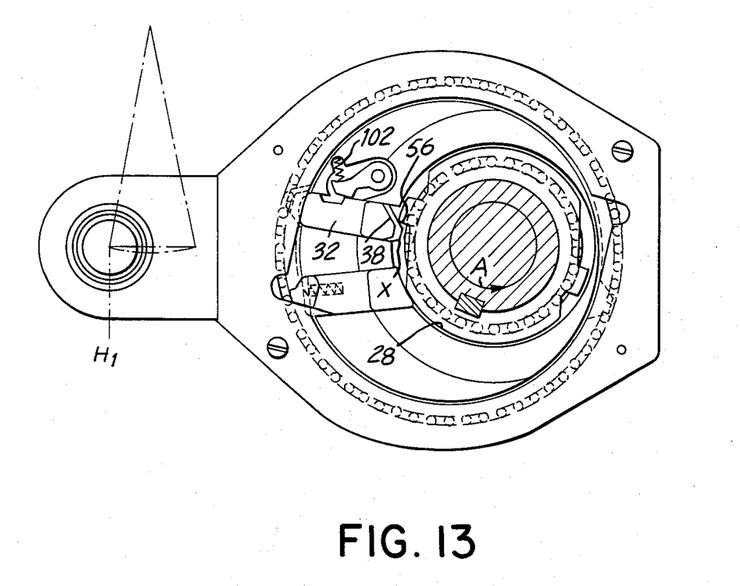
FIG. 13 is a view similar to FIG. 12, however, showing the retaining key accidentally displaced.

In FIG. 13 an almost improbable position situation is displayed where the retaining key 32 could accidentally, such as by rupture of the spring 102, be displaced into the X position shown in phantom lines. In such an occurrence, the coupling surface 56 in the coupling recess 22 would interact with the control surface 38 on the retaining key 32 so that the key would, without sustaining damages, be displaced back into its assigned position.

While specific embodiments of the invention have been shown and described in detail to illustrate the application of the inventive principles, it will be understood that the invention may be embodied otherwise without departing from such principles.

I claim:

1. Coupling arrangement such as for a textile machine, comprising a drive shaft capable of intermittent rotation about the axis thereof, an eccentric hoop extending around said drive shaft, a connecting member extending around said drive shaft with said eccentric hoop located between said drive shaft and said connecting member and said connecting member being supported on said eccentric hoop, a coupling key movably guided on said eccentric hoop for movement in the direction of displacement thereof approximately radially of said drive shaft, a first coupling recess associated with said drive shaft, a second coupling recess associated with said connecting member with said first coupling recess being located radially inwardly from said second coupling recess, a shifting member arranged to displace said coupling key alternately between engagement with said first coupling recess or said second coupling recess, lead cams for guiding said coupling key and retaining said coupling key in the one of said first and second coupling recesses into which it is displaced, wherein the improvement comprises a retaining key movably guided on said eccentric hoop along a rectilinear direction of displacement extending approximately in the radial direction relative to said drive shaft and being movable independently of said coupling key, said retaining key relative to the axis of said drive shaft being spaced angularly from and being separate from said coupling key, a first retaining recess associated with said drive shaft and spaced angularly from said first coupling recess, a second retaining recess associated with said connecting member and spaced angularly from said second coupling recess, said first retaining recess being located radially inwardly from said second retaining recess, a first force application side on said retaining key extending at an acute angle relative to the direction of displacement of said retaining key, a corresponding first force application side in said first retaining recess, a second force application side in said retaining key having the same acute angle relative to the direction of displacement as said first force application side of said retaining key, a corresponding second force application side in said second retaining recess, a first control side on said retaining key extending at an acute angle relative to the direction of displacement of said retaining key with the acute angle of said first control side being larger than the acute angle of said first force application side relative to the direction of displacement, a corresponding first control side in said first retaining recess, a second control side of said retaining key having the same acute angle relative to the direction of displacement as said first control side of said retaining key, a corresponding second control side in said second retaining recess and said control surfaces on said retaining key and in said first and second retaining recesses provide a displacement of said retaining key out of the one of said first and second retaining recesses during operation of said coupling arrangement.

2. Coupling arrangement, as set forth in claim 1, wherein said first and second force application sides are approximately parallel with a radial line extending from said drive shaft and said radial line is equiangularly spaced from said first coupling recess and said first retaining recess associated with said drive shaft.

3. Coupling arrangement, as set forth in claim 1, wherein said retaining key extends generally radially of said drive shaft and has a radially inner end and a radially outer end, the radially inner end of said retaining key is engageable within said first retaining recess associated with said drive shaft and the radial outer end of said retaining key is engageable within said second retaining recess associated with said connecting member, and said retaining recesses, and the radially inner and outer ends of said retaining key have rounded edges.

4. Coupling arrangement, as set forth in claim 1, wherein said first retaining recess associated with said drive shaft has a dimension in the circumferential direction of said drive shaft smaller than the dimension of said coupling key in the circumferential direction of said drive shaft so that said coupling key cannot seat within said first retaining recess.

5. Coupling arrangement, as set forth in claim 1, wherein said retaining key extends generally radially outwardly relative to said drive shaft, said retaining key has a recess in one of the radially outwardly extending sides thereof, a pawl mounted on said eccentric hoop and biased toward said retaining key, said pawl acts approximately perpendicularly of the radially extending side of said retaining key containing the recess when said retaining key is disengaged from said first retaining recess associated with said drive shaft, said pawl having a nose thereon engageable within the recess in the radially extending side of said retaining key when said retaining key engages within said first retaining recess associated with said drive shaft, and said pawl biases said retaining key radially inwardly toward said drive shaft when said nose is engaged within the recess in the radially extending side of said retaining key.

6. Coupling arrangement, as set forth in claim 1, wherein at least one of said first and second coupling recesses has a generally tangentially extending feed-side surface.

7. Coupling arrangement, as set forth in claim 1, wherein said coupling key extends generally radially of said drive shaft and said coupling key has a slit extending in the radial direction from the end thereof extending transversely of the radial direction and facing said drive shaft with said slit being open toward said drive shaft.

8. Coupling arrangement, as set forth in claim 1, wherein said coupling key is movable parallel to a radial line of said drive shaft equiangularly spaced between said coupling key and said retaining key, and said coupling key being angularly spaced from said radial line by a sufficient distance so that a supporting surface for said coupling key on said eccentric hoop extends parallel to an opposite coupling side in said first coupling recess.

9. Coupling arrangement, as set forth in claim 8, wherein said coupling key has a coupling side on the radially inner end thereof, said first coupling recess has a coupling side therein located in juxtaposed position to said coupling side on said coupling key when said coupling key is located within the first coupling recess and said coupling sides are inclined at an angle to the direction of displacement of said coupling key.

10. Coupling arrangement, as set forth in claim 8, wherein said coupling key has a coupling side on the radially inner end thereof, said first coupling recess has a coupling side therein located in juxtaposed position to said coupling side on said coupling key when said coupling key is located within the first coupling recess and said coupling sides are disposed parallel to the direction of displacement of said coupling key.

11. Coupling arrangement, as set forth in claim 1, wherein said connecting member includes at least one ring disposed along one side of said eccentric hoop, and said second coupling and second retaining recesses associated with said connecting member and one of said lead cams being formed as part of said ring.

12. Coupling arrangement, as set forth in claim 11, including a housing arranged coaxial to said drive shaft, and said ring is fixed to said housing so that it is secured in a stationary position relative to said drive shaft.

13. Coupling arrangement, as set forth in claim 11, wherein said ring is secured on said connecting member coaxial therewith.

14. Coupling arrangement, as set forth in claims 11 or 13, including attachment members securing said ring to said connecting member and said attachment members are safety-shearing members which break when at least one of said coupling key and retaining key become jammed.

15. Coupling arrangement, as set forth in claim 11, wherein said eccentric hoop is located radially inwardly from said connecting member, a bearing located between said eccentric hoop and said connecting member, said ring extends radially relative to said drive shaft and is disposed laterally opposite the radially outer part of said eccentric hoop and the radially inner part of said connecting member and also extends over said bearing between said eccentric hoop and said connecting member.

16. Coupling arrangement, as set forth in claim 15, wherein another ring is located on the opposite side of said eccentric hoop and connecting member from said ring.

17. Coupling arrangement, as set forth in claim 1, wherein said drive shaft includes at least one ring secured thereon, and said coupling recess and first retaining recess and one of said lead cams being formed on said ring.

18. Coupling arrangement, as set forth in claim 1, wherein said coupling key includes at least one spring biasing said coupling key inwardly into the first coupling recess associated with said drive shaft, and said shifting member arranged to displace said coupling key radially outwardly from said first coupling recess against the biasing action of said spring.

19. Coupling arrangement, as set forth in claim 1, wherein said coupling key includes a driver cam projecting outwardly from said coupling key and axially parallel with said drive shaft, and said shifting member having a cam thereon and said cam on said shifting member acting on said driver cam for displacing said coupling key in the displacement direction.

20. Coupling arrangement, as set forth in claim 18, wherein said shifting member comprises a shifting ring extending over the travel path of said driver cam, said shifting ring having a guide groove therein through which said driver cam travels, said groove having an inner side on which said cam of said shifting member is located and said connecting member is supported eccentrically and axially parallel with said drive shaft so that said connecting member is reciprocated in response to the rotation of said drive shaft and eccentric hoop.

* * * * *